United States Patent [19]

DeMario et al.

[11] Patent Number: 4,803,043
[45] Date of Patent: Feb. 7, 1989

[54] NUCLEAR FUEL ROD GRID SPRING AND DIMPLE STRUCTURES

[75] Inventors: Edmund E. DeMario, Columbia; Bobby D. Street, West Columbia, both of S.C.

[73] Assignee: Westinghouse Electric Corp., Pittsburgh, Pa.

[21] Appl. No.: 125,514

[22] Filed: Nov. 25, 1987

Related U.S. Application Data

[63] Continuation-in-part of Ser. No. 53,990, May 22, 1987, abandoned.

[51] Int. Cl.[4] .............................................. G21C 3/34
[52] U.S. Cl. ..................................... 376/442; 376/438
[58] Field of Search ................................. 376/442, 438

[56] References Cited

U.S. PATENT DOCUMENTS

| | | | |
|---|---|---|---|
| 3,933,584 | 1/1976 | Litt | 376/442 |
| 4,396,573 | 8/1983 | Feutnel | 376/442 |
| 4,692,302 | 9/1987 | DeMario | 376/439 |

Primary Examiner—Donald P. Walsh

[57] ABSTRACT

A nuclear fuel assembly grid includes a fuel rod engaging spring structure formed on each cell wall section of inner straps being interleaved with outer straps to form a matrix of fuel rod receiving cells in the grid. Each spring structure is composed of a pair of laterally spaced spring leg members each extending vertically and anchored at their respective pairs of opposite ends to the wall section and a fuel rod engaging cross spring member which extends diagonally between and integrally connects to the spring leg members. The leg members and cross member are respectfully curved and arched in configuration along respective longitudinal sections so as to project from the wall section toward the longitudinal axis of the grid cell. Further, the cross spring member is preferably disposed approximately forty-five degrees to the direction of the longitudinal axis of the cell and to the direction of coolant fluid flow through the grid and fuel assembly in which the grid is used. The grid also includes fuel rod engaging dimples formed on each cell wall section of the inner straps. The dimples are oriented diagonally, preferably at forty-five degrees to the direction of the longitudinal axis of the cell.

30 Claims, 12 Drawing Sheets

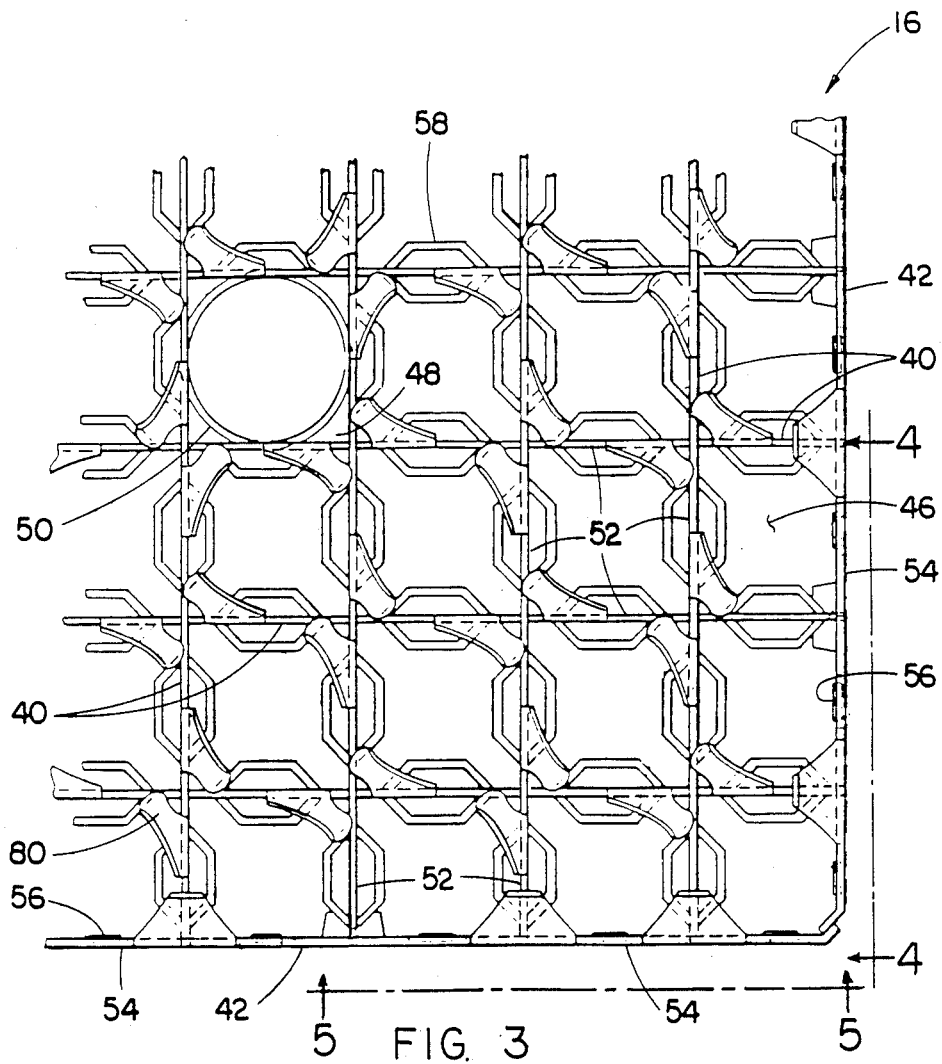
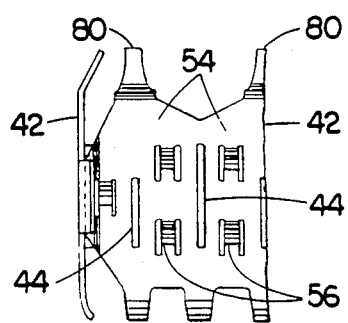
FIG. 4
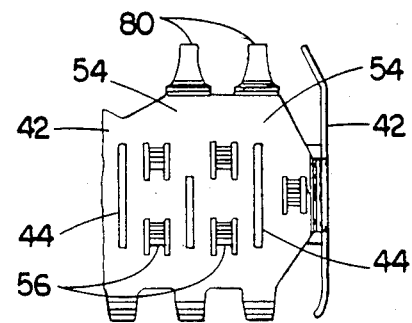
FIG. 5

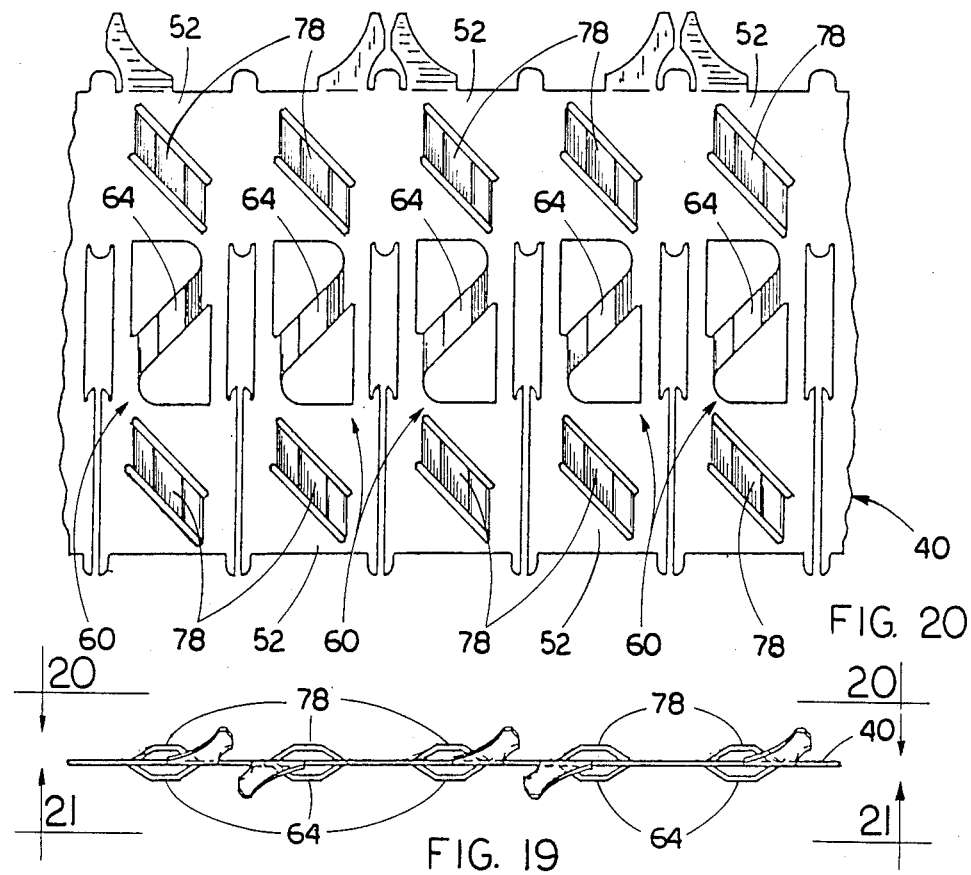
FIG. 20
FIG. 19
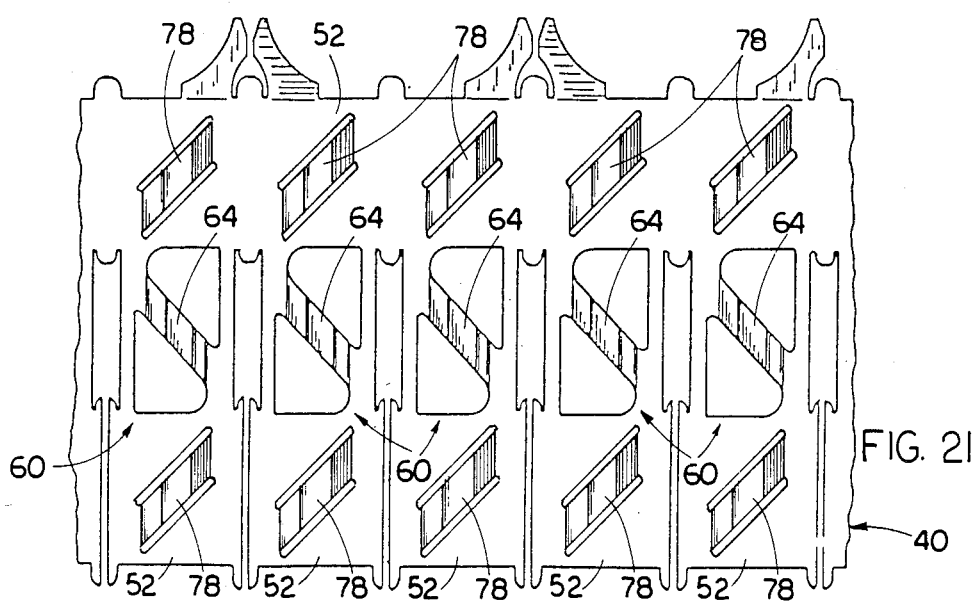
FIG. 21

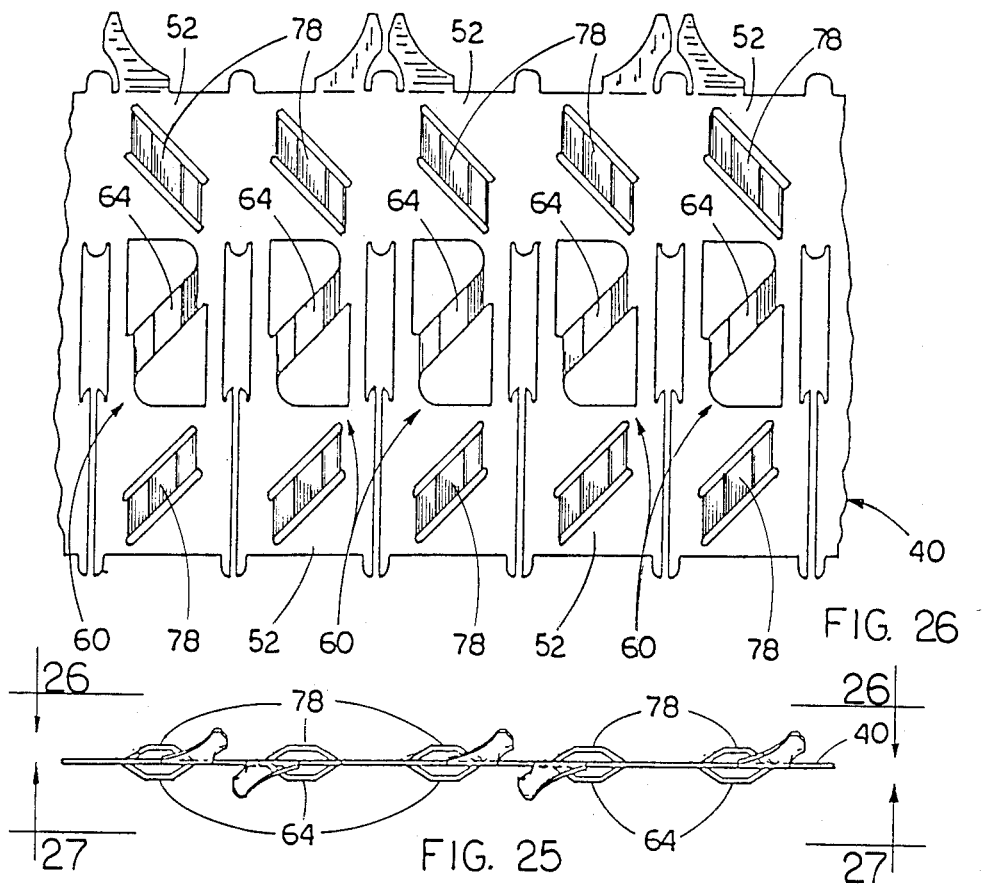
FIG. 26
FIG. 25
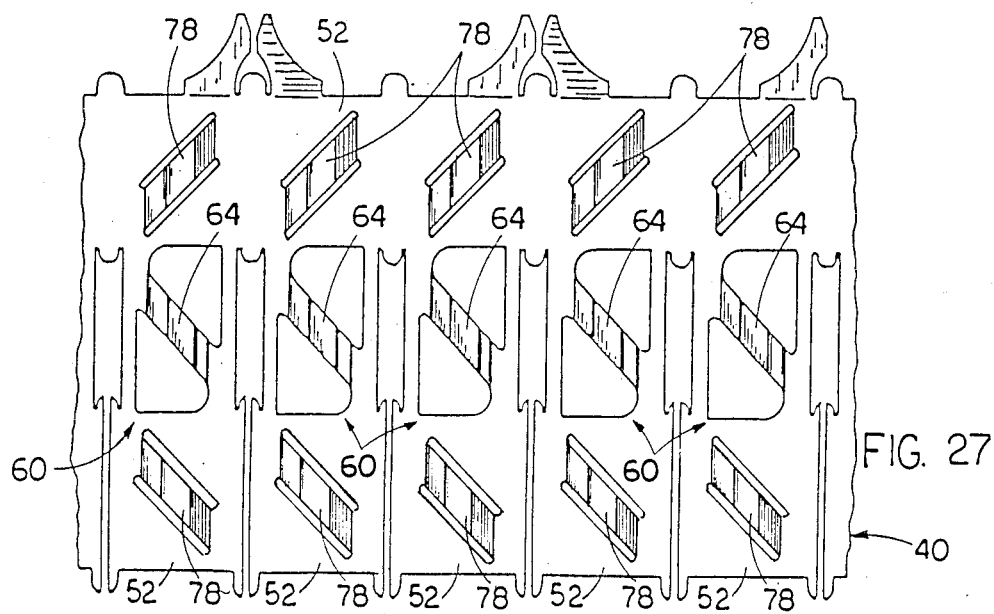
FIG. 27

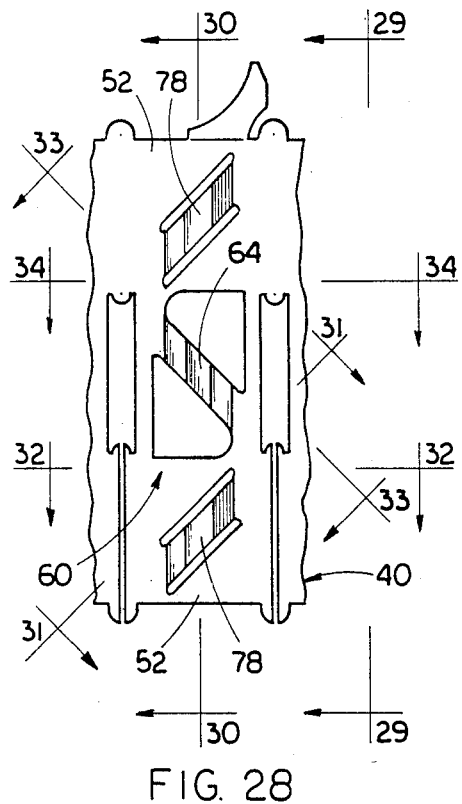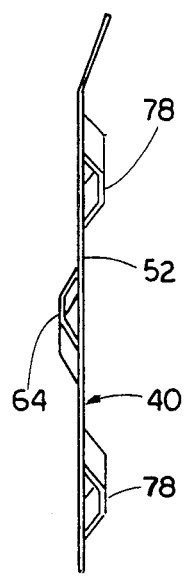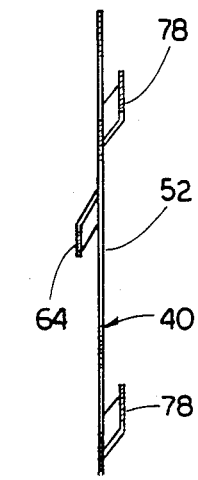
FIG. 28  FIG. 29  FIG. 30
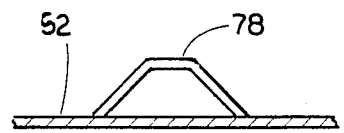 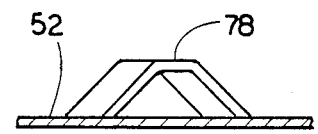
FIG 32  FIG. 31
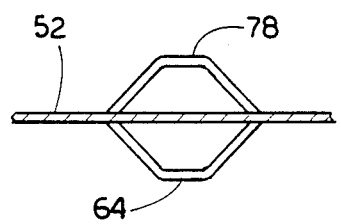 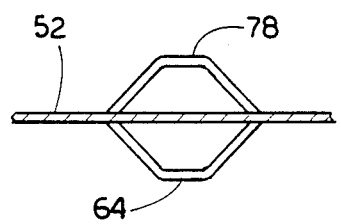
FIG. 34  FIG. 33

NUCLEAR FUEL ROD GRID SPRING AND DIMPLE STRUCTURES

This application is a continuation-in-part of copending U.S. patent application Ser. No. 053,990, filed May 22, 1987, now abandoned.

CROSS REFERENCE TO RELATED APPLICATIONS

References is hereby made to the following applications dealing with related subject matter and assigned to the assignee of the present invention:

1. "Nuclear Fuel Spacer Grid With Improved Grid Straps" by Edmund E. DeMario, assigned U.S. Ser. No. 473,516 and filed March 9, 1983.
2. "Nuclear Fuel Spacer Grid With Improved Outer Straps" by Edmund E. DeMario et al, assigned U.S. Ser. No. 473,515 and filed Mar. 9, 1983.
3. "Partial Grid For A Nuclear Reactor Fuel Assembly" by Edmund E. DeMario, assigned U.S. Ser. No. 564,049 and filed Dec. 21, 1983.
4. "A Low Pressure Drop Grid For A Nuclear Reactor Fuel Assembly" by Edmund E. DeMario et al, assigned U.S. Ser. No. 567,448 and filed Dec. 30, 1983.
5. "A Coolant Flow Mixer Grid For A Nuclear Reactor Fuel Assembly" by Edmund E. DeMario et al, assigned U.S. Ser. No. 567,450 and filed Dec. 30, 1983.
6. "Nuclear Fuel Rod Support Grid With Improved Multiple Dimple Arrangement" by John A. Rylatt, assigned U.S. Ser. No. 729,387 and filed May 1, 1985.

BACKGROUND OF THE INVENTION

. Field of the Invention

The present invention relates generally to nuclear fuel assemblies and, more particularly, is concerned with a nuclear fuel rod grid having unique fuel rod engaging spring and dimple structures.

2. Description of the Prior Art

In most nuclear reactors, the reactor core is comprised of a large number of elongated fuel assemblies. Conventional designs of these fuel assemblies include a plurality of fuel rods held in an organized array by a plurality of grids spaced axially along the fuel assembly length and attached to a plurality of elongated control guide thimbles of the fuel assembly. Top and bottom nozzles on opposite ends of the fuel assembly are secured to the guide thimbles which extend slightly above and below the ends of the fuel rods.

The grids as well known in the art are used to precisely maintain the spacing between the fuel rods in the reactor core, prevent rod vibration, provide lateral support for the fuel rods, and, to some extent, frictionally retain the rods against longitudinal movement. Representative grid designs include those of some of the patent applications cross-referenced above.

One popular conventional grid design, being illustrated and described in U.S. Pat. Ser. No. 4,492,844 to Kobuck et al and assigned to the assignee of the present invention, includes a multiplicity of interleaved inner and outer straps having an egg-crate configuration foming a multiplicity of cells which individually accept the fuel rods and control rod guide thimbles. The cells of each grid which accept and support the fuel rods at a given axial location therealong typically use relatively resilient springs and/or relatively rigid protrusions (called dimples) formed into the metal of the interleaved straps. The springs and dimples of each grid cell frictionally engage or contact the respective fuel rod extending through the cell. Additionally, the outer straps are attached together and peripherally enclose the inner straps to impart strength and rigidity to the grid.

However, several drawbacks arise from this particular grid design. The vertical orientation and configuration of the fuel rod engaging springs require that the springs and thus the grid be of substantial height in order for the springs to have the desired amount of resiliency to function properly. This requirement increases the amount of parasitic structural material utilized in the fuel assembly and the pressure drop through the fuel assembly. Also, the horizontal orientation of the grid dimples, although providing for coolant flow through the dimples without an accompanying pressure drop, causes catching or hang-up of the fuel rods on the dimples as the fuel rods are pulled through the grid. On the other hand, dimples of vertical orientation, although solving the fuel rod hang-up problem, don't allow for coolant flow through the dimples and thus increase pressure drop.

Representative of other prior art grid designs are the ones described and illustrated in U.S. Pat. Nos. to Kooistra (3,070,534), Warberg (3,679,547), Jabsen (3,795,040), Wachter et al (3,928,131), Piepers et al (3,646,994), Creagan et al (4,061,536) and Masetti (4,090,918); French Pat. No. 1,497,083; West German Pat. No. 1,961,035; and Japanese Pat. No. 61-90085. While all of these grids may function satisfactory and generally achieve the objectives for which they were designed, none would appear to suggest an approach which will satisfactorily overcome the aforementioned drawbacks of the one conventional grid design briefly described above. Consequently, a need still exists for an improved grid spring structure which will avoid the above drawbacks without presenting new ones in their place.

SUMMARY OF THE INVENTION

The present invention provides a fuel rod grid designed to satisfy the aforementioned needs. The grid of the present invention includes inner grid straps containing unique fuel rod engaging spring structures and dimples on wall sections thereof defining a matrix of I0 fuel rod receiving grid cells. Each spring structure is composed of a pair of laterally spaced spring leg members each extending vertically and anchored at their respective pairs of opposite ends and a cross spring member which extends diagonally between and integrally connects to the spring leg members. Both of the leg members are curved slightly and the cross is arched, all projecting toward the longitudinal axis of the grid cell. By such arrangement, the spring structure has an effective length approximately two times greater than the actual length it occupies within the grid, allowing a substantial reduction in the height of the grid over the one having the prior vertically-oriented spring configuration.

Further, the cross spring member is preferably set approximately forty-five degrees to the direction of the longitudinal axis of the grid cell and to the direction of coolant fluid flow through the grid and fuel assembly in which the grid is used. Yet the cross spring member is open with respect to the direction of flow. Forty-five degrees appears to be the optimum angle so that grid height can be reduced and spring profile exposed to coolant flow can be minimized. Angles greater than fortyfive degrees will increase pressure drop due to increased grid height, whereas lesser angles increase blockage of flow. The profile of the improved spring structure as seen by the flow is actually less than a horizontal dimple because smaller radii can be stamped due to the forty-five degree angle. The diagonal cross member also stiffens the inner grid strap and thereby the grid and increases its stability.

By using vertical spring leg members as the spring levers, the design of the unique spring structure gives a soft compliant spring action. When a fuel rod is inserted, it engages the middle of the cross member and causes deflection of the vertical leg members away from the longitudinal axis of the cell so that the leg members are placed in profile (or plane) of the wall section of the inner grid strap and thereby offer no additional blockage to coolant flow.

Also, as in the case of each cross spring member, each dimple is preferably set approximately forty-five degrees to the direction of the longitudinal axis of the grid cell and to the direction of coolant fluid flow through the grid. The dimple has an arched configuration which, in effect, provides a ramp which eliminates hangup of fuel rods being inserted through the grid.

Accordingly, the present invention is directed to a plurality of fuel rod engaging spring structures in a nuclear fuel rod grid. The grid includes a plurality of inner and outer straps being interleaved with one another to form a matrix of hollow cells, each cell for receiving one fuel rod and being defined by pairs of opposing wall sections of the straps which wall sections are shared with adjacent cells. Each cell has a central longitudinal axis. Each fuel rod engaging spring structure made of resiliently yieldable material and integrally formed on each wall section of the inner straps, includes: (a) a pair of laterally spaced elongated leg members each having a pair of opposite ends only at which it is anchored to the wall sections; and (b) an elongated cross member having a pair of opposite ends, the cross member extending diagonally between and integrally attached at its opposite ends to the leg members such that the spring structure formed by the leg and cross members has an effective length greater than the actual length it occupies on the wall section. The cross member at one of its opposite ends is rigidly attached to one of the leg members adjacent to one end thereof and at the other of its opposite ends is rigidly attached to the other of the leg members adjacent to the opposite other end thereof.

More particularly, each leg member is arcuate-shaped in its configuration along a longitudinal section therethrough so as to project from the wall section into one of the cells toward the longitudinal axis thereof. The cross member is arcuate-shaped in configuration along a longitudinal section therethrough so as to project from the wall section farther into one cell toward the longitudinal axis thereof than the leg members project into the one cell for engaging a fuel rod when received through the one cell.

Still further, the cross member is capable of resiliently deflecting in a direction generally orthogonal to and away from the longitudinal axis of the cell and toward the wall section upon engagement by a fuel rod when received in the cell. Each wall section is generally planar in configuration. The leg members project from the plane of one wall section when the cell is unoccupied by a fuel rod but are capable of resiliently deflecting back within the plane of the wall section due to resilient yielding of the cross member by engagement with a fuel rod received within the cell.

Also each leg member extends generally parallel to one another and in a direction generally parallel to the longitudinal axis of the cell. The cross member is disposed approximately forty-five degrees with respect to each leg member and with respect to the direction of the longitudinal axis of the cell.

Furthermore, the present invention is directed to a plurality of fuel rod engaging dimples in a nuclear fuel rod grid. Each fuel rod engaging dimple is made of resiliently yieldable material and integrally formed on each wall section of the inner straps. Dimples are located both above and below the spring structures on the wall sections. Each dimple extends into the respective grid cell and is oriented diagonally with respect to the central longitudinal axis of the respective grid cell. The diagonal orientation of the dimple above the spring structure is either parallel to the orientations of the spring structures cross member and of the dimple below the spring structure, or orthogonal to one or both of them. The dimples are arcuate-shaped in configuration along a longitudinal section therethrough. Preferably, the diagonal orientation of each dimple is approximately forty-five degrees with respect to the cell longitudinal axis.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is an enlarged fragmentary top plan view of the lower right corner of the grid of FIG. 2.

FIGS. 4 and 5 are elevational views of end portions of the outer straps which meet to form the corner of the grid as seen along respective lines 4—4 and 5—5 of FIG. 3.

FIG. 19 is an enlarged fragmentary top plan view of a modified version of the inner strap of one set thereof in the grid of FIG. 2 which interfits with the modified version of the inner strap of the other set thereof in FIG. 22.

FIG. 20 is a side elevational view as seen along line 20—20 of FIG. 19 from one side of the modified inner strap in the one set thereof.

FIG. 21 is another side elevational view as seen along line 21—21 of FIG. 19 from an opposite side of the modified inner strap in the one set thereof.

FIG. 25 is an enlarged fragmentary top plan view of another modified version of the inner strap of either one or the other sets thereof in the grid of FIG. 2.

FIG. 26 is a side elevational view as seen along line 2613 26 of FIG. 25 from one side of the other modified version of inner strap.

FIG. 27 is another side elevational view as seen along line 2713 27 of FIG. 25 from an opposite side of the modified version of the inner strap.

FIG. 28 is a fragmentary portion of the side elevational view in FIG. 21 of the modified inner strap in the one set thereof.

FIG. 29 is an end elevational view as seen along line 29—29 of FIG. 28 showing one set of modified dimples and the spring structure on the modified inner strap.

FIG. 30 is a sectional view taken along line 30—30 of FIG. 28, showing the same set of modified dimples and spring structue as seen in FIG. 29.

FIG. 31 is an enlarged sectional view taken along line 31—31 of FIG. 28, showing the curvature of one of the modified dimples on the modified inner strap.

FIG. 32 is an enlarged sectional view taken along line 32—32 of FIG. 28, showing the curvature of the one of the modified dimples on the modified inner strap from a different angle than seen in FIG. 31.

FIG. 33 is an enlarged sectional view taken along line 33—33 of FIG. 28, showing the curvature of the cross member of the spring structure of the modified strap.

FIG. 34 is an enlarged sectional view taken along line 34—34 of FIG. 28, showing the curvature of one of the modified dimples and the cross member of the spring structure of the modified strap.

DETAILED DESCRIPTION OF THE INVENTION

Figure 1:
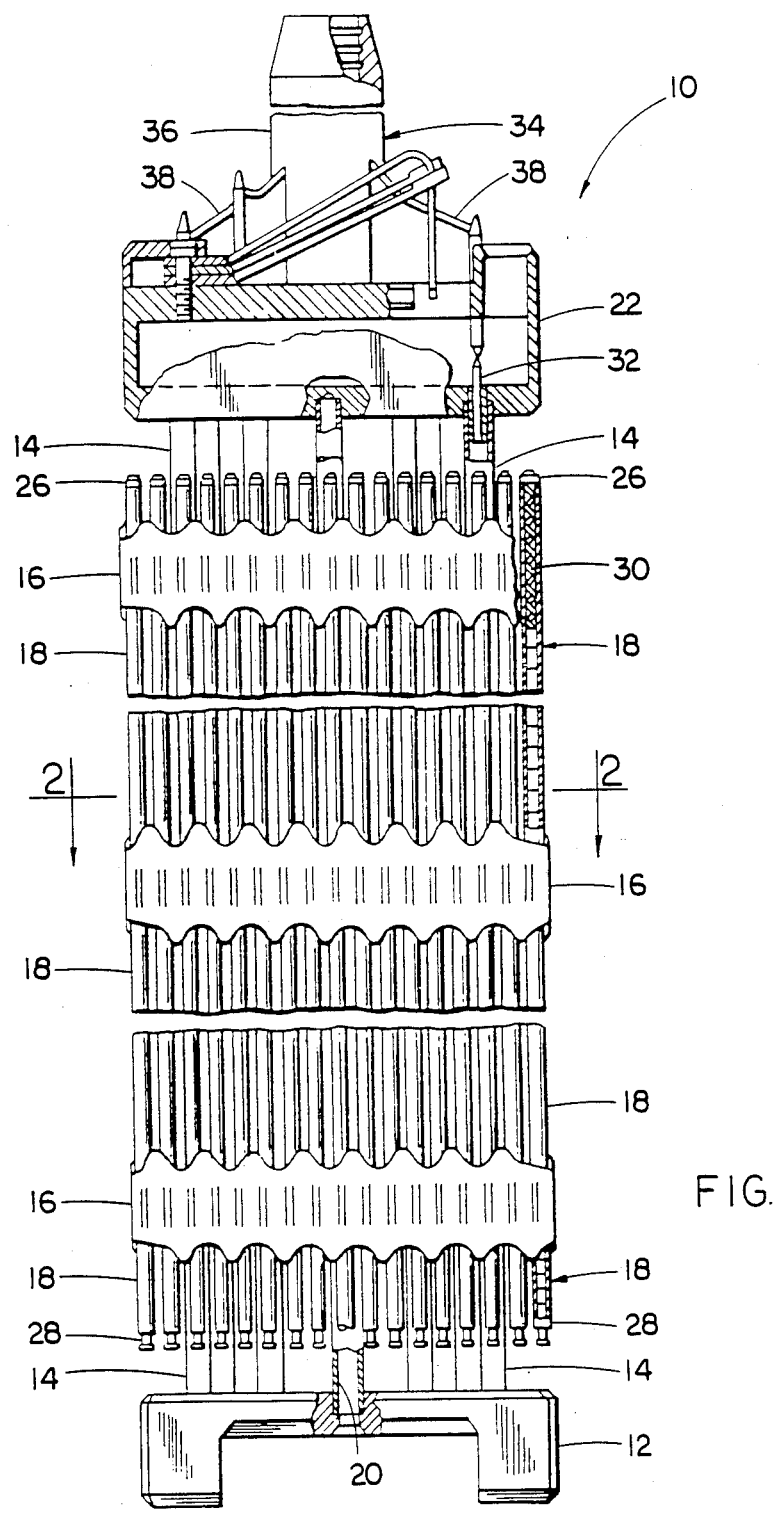
FIG. 1 is an elevational view, partly in section, of a fuel assembly which employs the fuel rod grid of the present invention, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 constructed in accordance with the principles of the present invention, as will be described in detail below. The grids 16 are axially spaced along and supported by the guide thimbles 14. The assembly 10 also includes a plurality of elongated fuel rods 18 transversely spaced and supported in an organized array by the grids 16. Also, the assembly 10 has an instrumentation tube 20 located in the center thereof and an upper end structure or top nozzle 22 attached to the upper ends of the guide thimbles 14. With such arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 has associated therewith a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Grids With Improved Sprinq Structure

Referring now to FIGS. 2–11, there is shown the preferred embodiment of the transverse fuel rod grid 16 constructed in accordance with the principles of the present invention. Basically, the grid 16 includes a plurality of inner and outer straps 40,42 having slots 44 by which the straps are interleaved with one another in an egg-crate configuration to form a matrix of hollow cells 46 and a plurality of openings 48. At the intersections of the straps 40,42, they are suitably secured together, such as by welding. The hollow cells 46 of the grid 16 receive therethrough respective ones of the fuel rods 18, whereas the openings 48 of the grid 16 have sleeves 50 inserted therein and attached to the inner straps 40 by which the grid 16 is disposed along and attached to the guide thimbles 14.

Each cell 46 receiving one fuel rod 18 is defined by pairs of opposing wall sections. The wall sections 52 compose the inner straps 40, whereas the wall sections 54 compose the outer straps 42. The inner strap wall sections 54 are shared with adjacent cells. As shown in FIGS. 3 to 5, the wall sections 54 of the outer strap 42 each has a pair of horizontally extending and vertically spaced fuel rod engaging dimples 56 integrally formed thereon in association with each cell 46. Similarly, the wall sections 52 of the inner straps 40 also each has a pair of horizontally extending and vertically spaced fuel rod engaging dimples 58 integrally formed thereon in association with each cell 46. One of the dimples 58 on each wall section 52 of the inner straps 40 is located above the spring structure 60 of the present invention, whereas the other dimple 58 is located below it. Each cell 46 formed along the periphery of the grid 16 by the inner and outer straps 40,42 has associated with it four dimples 56,58 and two spring structures 60, whereas each cell 46 formed in the grid 16 by inner straps 40 only has associated with it four dimples 56 and two spring structures 60. Thus, each fuel rod in each cell 46 is contacted at six circumferentially and axially displaced locations thereon.

More particularly, as seen in FIGS. 6 to 18, each fuel rod spring engaging structure 60, in accordance with the principles of the present invention, is composed of resiliently yieldable flexible material of the inner straps 40, such as stainless steel metal. The components of the spring structure 60, which will be described next, are integrally formed, such as by a conventionally stamping operation, from and on each wall section 52 of the inner straps 40 in association with each cell 46 of the grid 16.

Basically, each spring structure 60 includes a pair of laterally spaced elongated spring leg members 62 and 15 W.E. 53,856-I an elongated spring cross member 64. Each leg member 62 has a pair of opposite upper and lower ends 66,688 and is anchored by being integrally and rigidly connected to the upper and lower portions 70,72 of the respective wall section 52 at only the leg member upper and lower ends 66,688. Each cross member 64 has a pair of upper and lower opposite ends 74,76 and extends diagonally between and is integrally attached at such respective ends to the leg members 62 of a pair thereof such that the spring structure 60 formed by the leg and cross members 62,64 has an effective length greater than (for instance, two times) the actual length it occupies on each wall section 52 of the inner straps 40.

More specifically, the cross member 64 at its upper end 74 is rigidly attached to one of the leg members 62 adjacent to the upper end 66 thereof and at its lower end 76 is rigidly attached to the other of the leg members 62 adjacent to the lower end 68 thereof. Also, each leg member 62 extends generally parallel to one another and in a direction generally parallel to the central longitudinal axis of the respective grid cell 46. Preferably the cross member 64 is disposed approximately forty-five degrees with respect to the leg members 62 and to the direction of coolant fluid flow through the grid and to the longitudinal axis of the respective grid cell 46.

Figure 15:
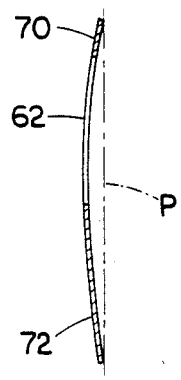
FIG. 15 is an enlarged sectional view taken along line 15—15 of FIG. 12, showing the curvature of the leg members of the spring structure of the inner strap.
Figure 18:
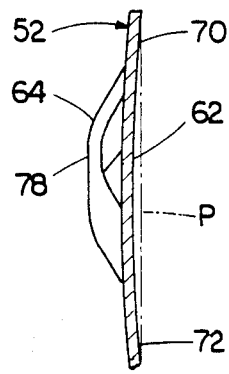
FIG. 18 is another enlarged sectional view taken along line 18—18 of FIG. 12, showing the curvature of leg and cross members of the spring structure on the inner strap.
Figure 16:
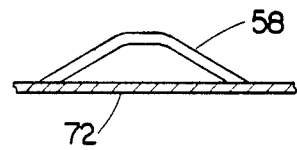
FIG. 16 is an enlarged sectional view taken along line 1613 16 of FIG. 12, showing the curvature of one of the dimples on the inner strap.
Figure 17:
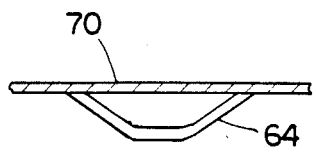
FIG. 17 is an enlarged sectional view taken along line 17—17 of FIG. 12, showing the curvature of the cross member of the spring structure on the inner strap.

Still further, as seen in FIGS. 15 and 18, each leg member 62 is slightly bowed or arcuate-shaped in its configuration along a longitudinal section through the leg member. Given such curvature, the leg member 62 projects from the plane P of the wall section 52 into its associated one of the cells 46 toward the central longitudinal axis thereof. Each cross member 64 is arched or arcuate-shaped in configuration along a longitudinal section of the cross member. Given such configuration, the cross member 64 projects from the leg members 62 away from the wall section 52 a farther distance into the associated cell 46 toward its longitudinal axis than does the leg members 62. At such position, the cross member 64 at its middle point 78 engages the fuel rod 18 received through the cell 46.

The cross member 64 is capable of resiliently deflecting or yielding in a direction generally orthogonal to and away from the longitudinal axis of the associated cell 46 and toward the wall section 52 upon engagement by a fuel rod when inserted in the cell 46. The leg members 62 project from the plane P of the wall section 52 when the cell 46 is unoccupied by a fuel rod 18. However, they are capable of resiliently deflecting back within the wall section plane P due to resilient deflection of the cross member 64 by its engagement with the fuel rod 18 in the cell 46. In such deflected positions, the leg members 62 do not block coolant flow through the grid 16. As seen in FIGS. 13 14, 16 and 17, the cross member 64 like the dimples 58 project from the wall section 52 so as to define an open space therebetween which permits unimpeded flow of coolant fluid therethrough and along the fuel rod received in the cell.

In summary, the configuration of the spring structure 60 allows a very low profile, a reduced grid height, and a low spring constant. The spring cross member 64 is set forty-five degrees to the direction of coolant fluid flow, but in manufacture is stamped out parallel to the direction of flow. The spring structure 60 has the pair of integral flexible spring leg members 62 which allow the spring structure to be compliant without adding to flow blockage.

While not forming part of the present invention, the grid 16 can have mixing vanes 80 formed along the top edge of the inner and outer straps 40,42 thereof.

Grids With Improved Dimples

Figure 2:
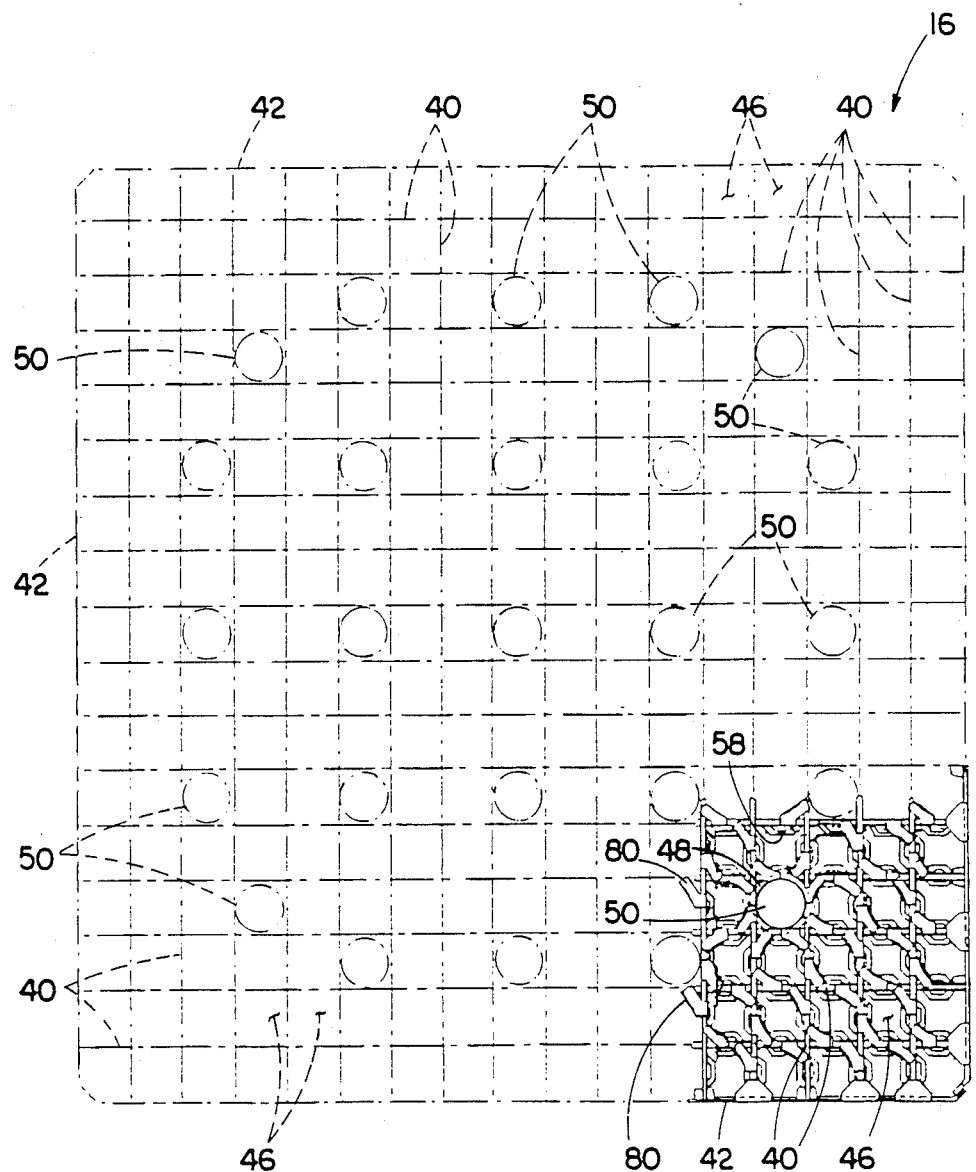
FIG. 2 is an enlarged top plan view, as seen along line 2—2 of FIG. 1, of the fuel rod grid having the fuel rod engaging spring structures of the present invention, showing the grid removed from the fuel assembly.
Figure 7:
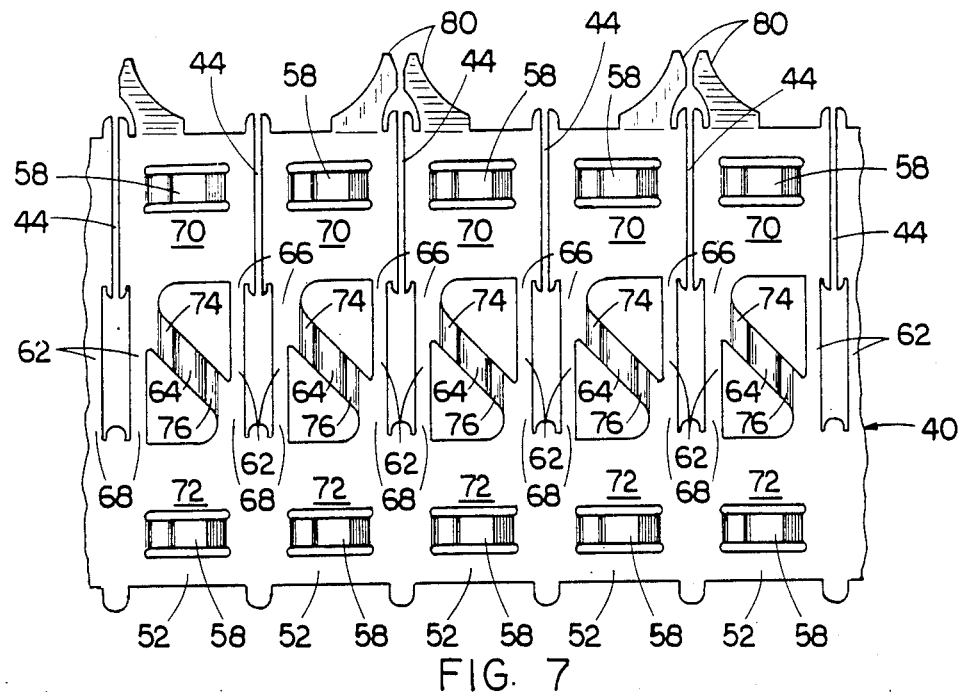
FIG. 7 is a side elevational view as seen along line 7—7 of FIG. 6 from one side of the inner strap in the one set thereof.
Figure 6:
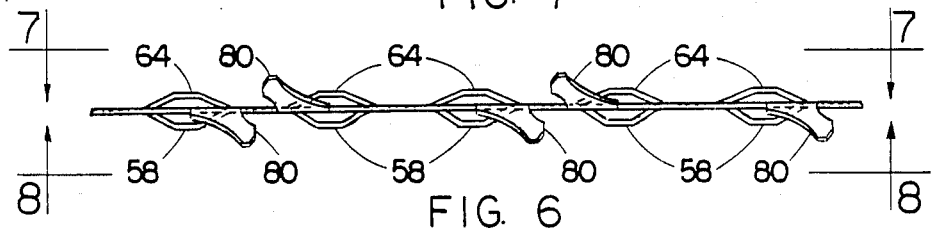
FIG. 6 is an enlarged fragmentary top plan view of the inner strap of one set thereof in the grid of FIG. 2 which interfits with the inner strap of the other set thereof shown in FIG. 9.
Figure 8:
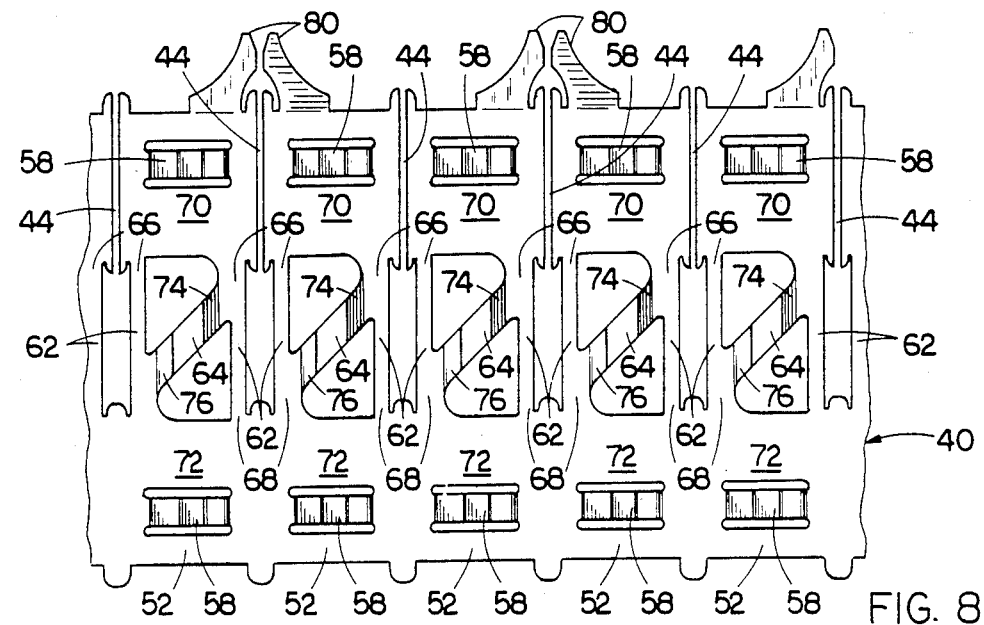
FIG. 8 is another side elevational view as seen along line 8—8 of FIG. 6 from an opposite side of the inner strap in the one set thereof.
Figure 10:
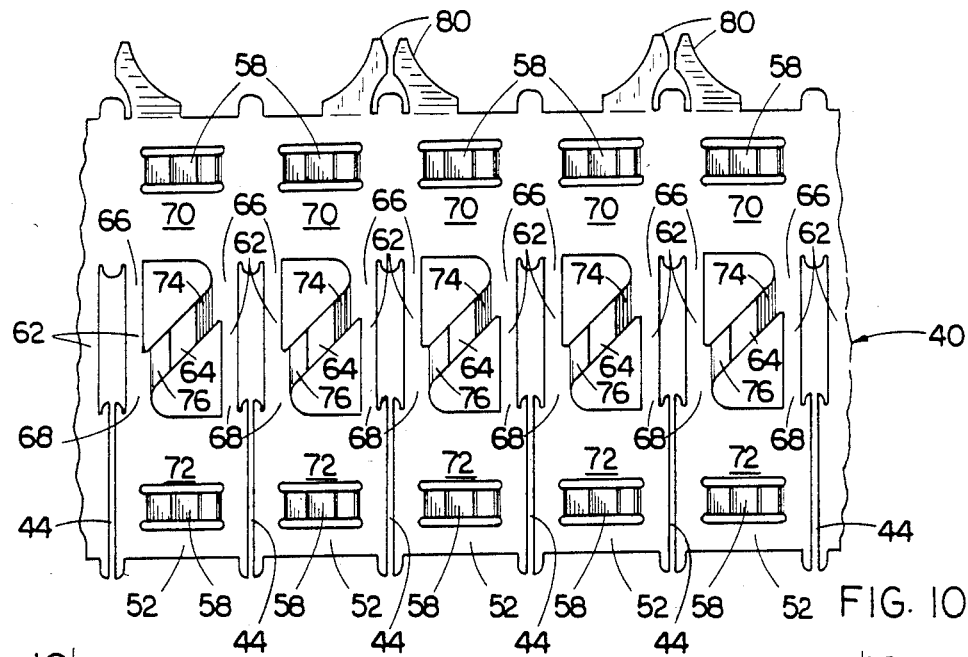
FIG. 10 is a side elevational view as seen along line 10—10 of FIG. 9 from one side of the inner strap in the other set thereof.
Figure 9:
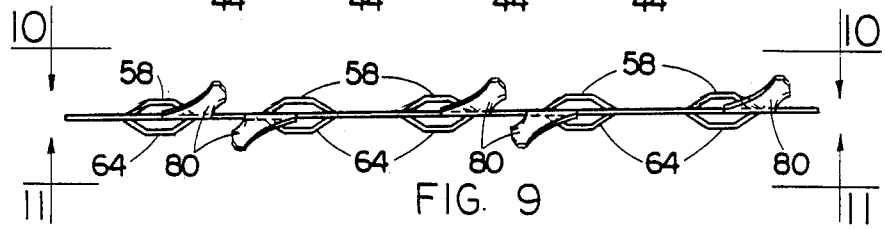
FIG. 9 is an enlarged fragmentary top plan view of the inner strap of the other set thereof in the grid of FIG. 2 which interfits with the inner strap of the one set thereof shown in FIG. 6.
Figure 11:
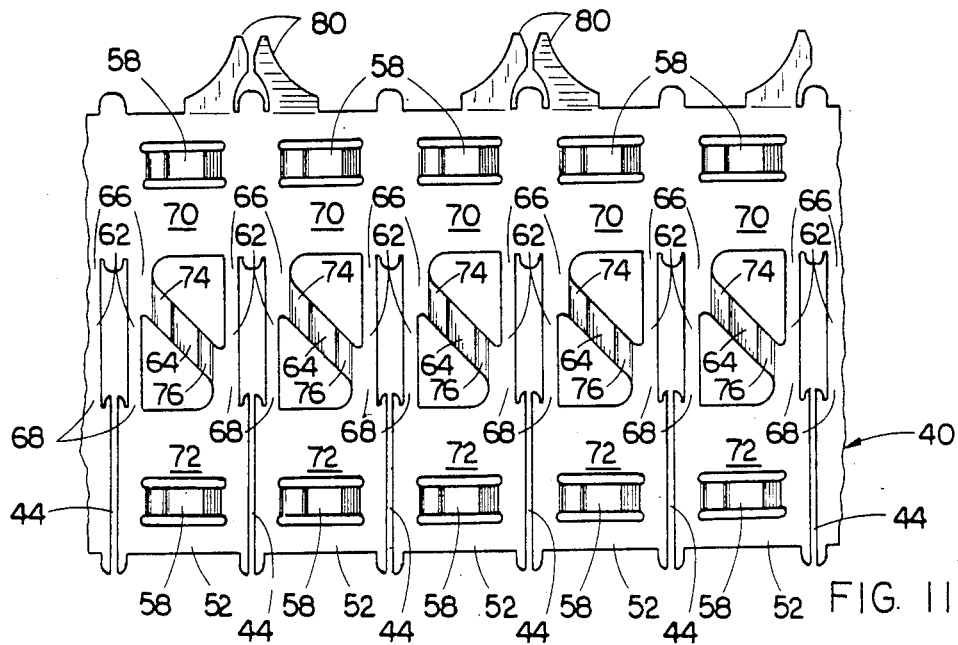
FIG. 11 is another side elevational view as seen along line 11—11 of FIG. 9 from an opposite side of the inner strap in the other set thereof.
Figure 12:
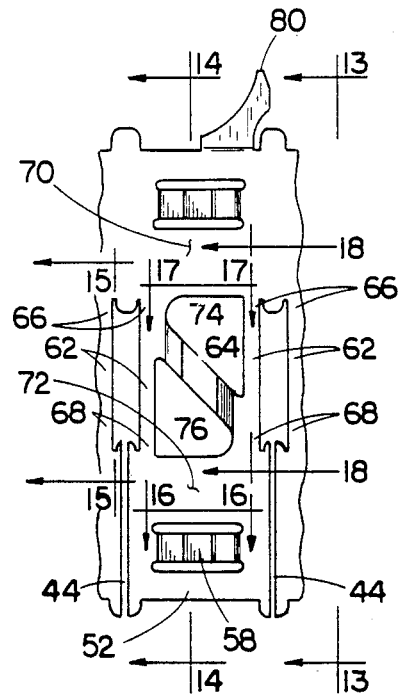
FIG. 12 is a fragmentary portion of the side elevational view in FIG. 11 of the inner strap in the other set thereof.
Figure 13:
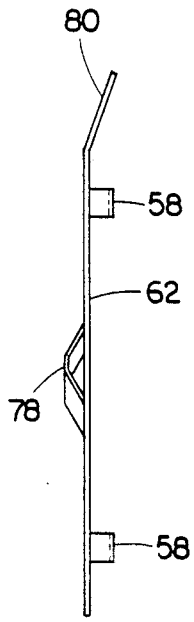
FIG. 13 is an end elevational view as seen along line 13—13 of FIG. 12, showing one set of the dimples and the spring structure on the inner strap.
Figure 14:
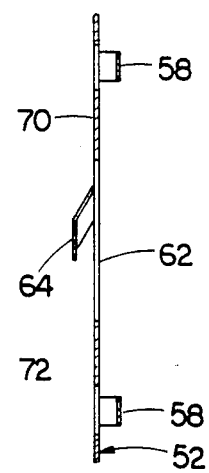
FIG. 14 is a sectional view taken along line 14—14 of FIG. 12, showing the same set of dimples and spring structure of the inner strap as seen in FIG. 13.

Referring now to FIGS. 19–48, there is shown modified versions of dimples 78 on the inner straps 40 of the transverse fuel rod grid 16 of FIG. 2. Since all of the parts of the inner straps 40 illustrated in FIGS. 6–18 are identical to the parts of the inner straps 40 illustrated in FIGS. 19–48 except for the dimples 58 which are now replaced by modified dimples 78, all of these identical parts will not be identified again in FIGS. 19–48.

Each dimple 78 is made of the same resiliently yieldable material of the straps 40 and integrally formed, such as by a stamping operation, on each wall section 52 thereof of each cell 46. As before, the dimples 78 as located spaced above and below the spring structure 60 on the wall section 52. Also, each dimple 78 extends or projects into the respective grid cell 46 and is arcuate-shaped along a longitudinal section therethrough.

However, each dimple 78 is modified to extend in a diagonal orientation with respect to the central longitudinal axis of the respective grid cell 46. Preferably, the diagonal orientation of each dimple 78 is approximately forty-five degrees with respect to the cell longitudinal axis, the same as the angular orientation of the cross member 64 of each spring structure 60.

In FIGS. 20, 21 and 28, the upper and lower dimples 78 are oriented generally parallel to one another. However, the dimples 78 are oriented generally orthogonal or perpendicular to the orientation of the spring structure cross members 64.

Figure 23:
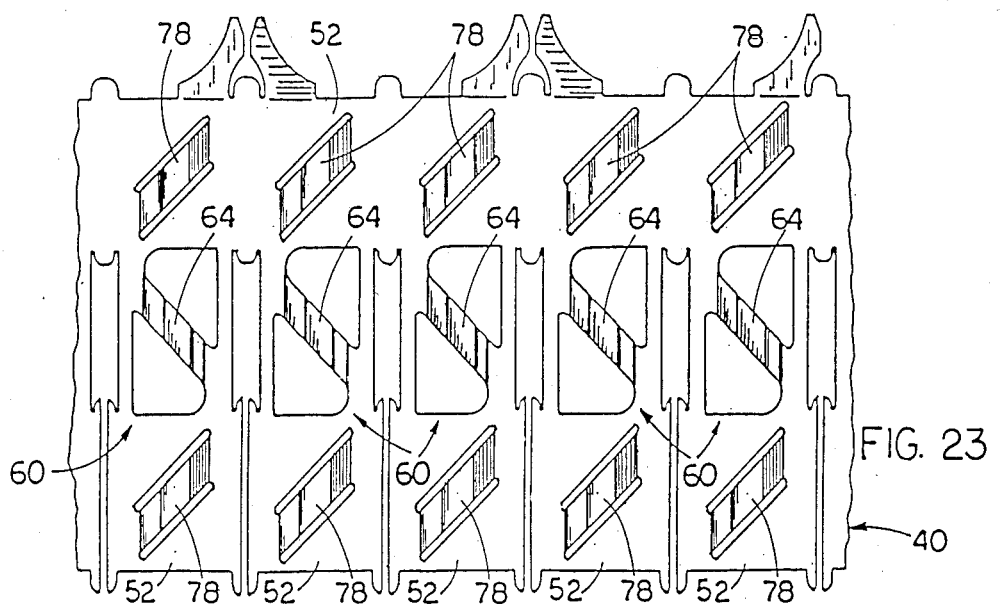
FIG. 23 is a side elevational view as seen along line 2313 23 of FIG. 22 from one side of the modified inner strap in the other set thereof.
Figure 22:
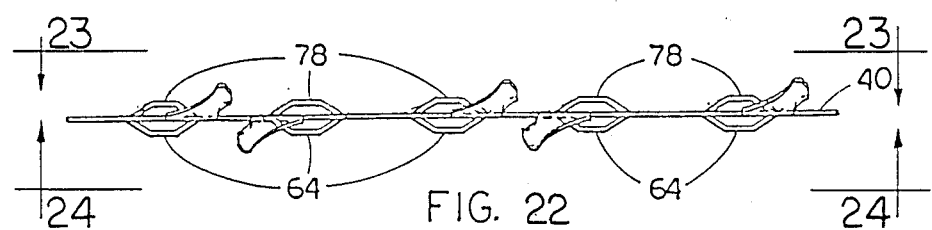
FIG. 22 is an enlarged fragmentary top plan view of a modified version of the inner strap of the other set thereof in the grid of FIG. 2 which interfits with the modified version of the inner strap of the one set thereof in FIG. 19.
Figure 24:
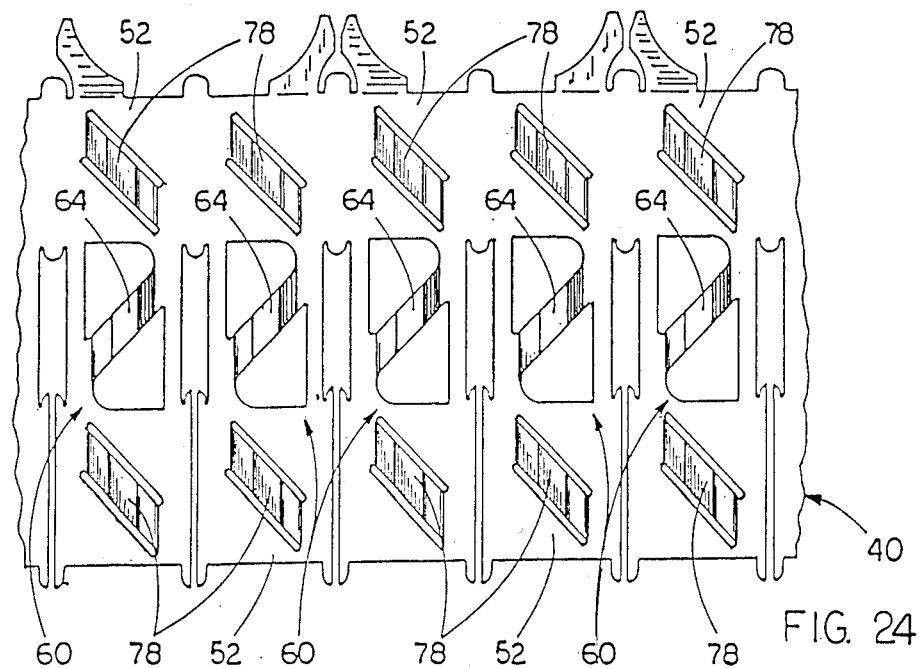
FIG. 24 is another side elevational view along line 2413 24 of FIG. 22 from an opposite side of the modified inner strap in the other set thereof.
Figure 35:
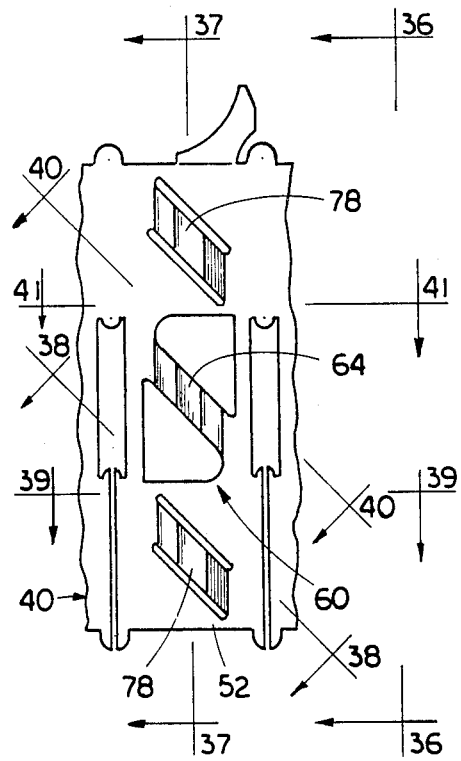
FIG. 35 is a fragmentary portion of the side elevational view in FIG. 24 of the modified inner strap in the other set thereof.
Figures 36, 37:
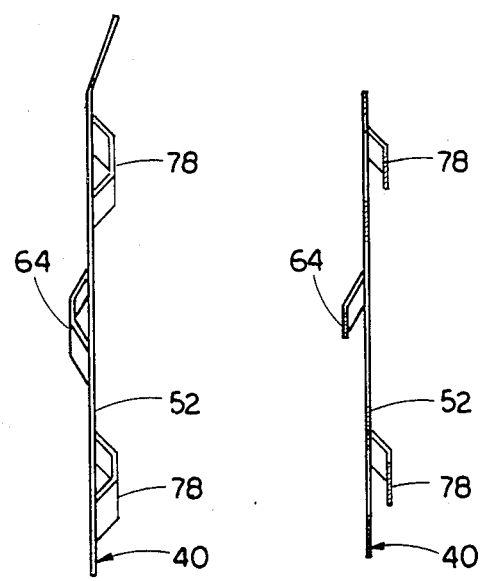
FIG. 36 an end elevational view as seen along line 36—36 of FIG. 35, showing the other set of modified dimples and the spring structure on the modified inner strap.
FIG. 37 is a sectional view taken along line 37—37 of FIG. 35, showing the same set of modified dimples and spring structures as seen in FIG. 36.
Figure 39:
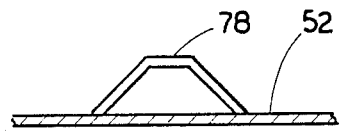
FIG. 39 is an enlarged sectional view taken along line 39—39 of FIG. 35, showing the curvature of the one of the modified dimples on the modified inner strap from a different angle than seen in FIG. 38.
Figure 38:
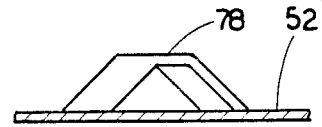
FIG. 38 is an enlarged sectional view taken along line 38—38 of FIG. 35, showing the curvature of one of the modified dimples on the modified inner strap.
Figure 41:
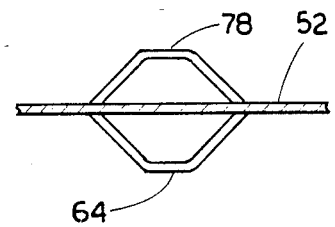
FIG. 41 is an enlarged sectional view taken along line 41—41 of FIG. 35, showing the curvatures of one of the modified dimples and cross member of the spring structure of the modified strap.
Figure 40:
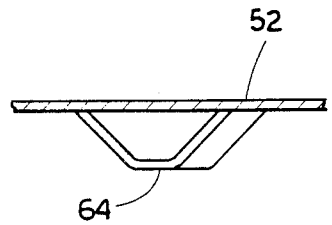
FIG. 40 an enlarged sectional view taken along line 40—40 of FIG. 35, showing the curvature of the cross member of the spring structure of the modified strap.
Figure 42:
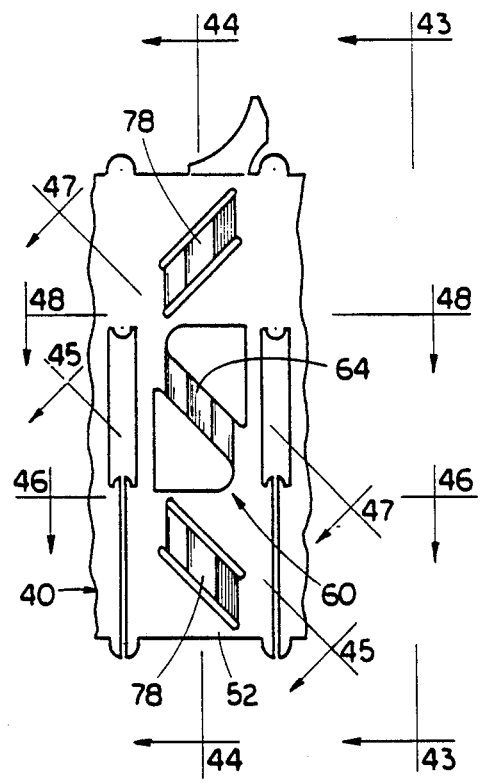
FIG. 42 is a fragmentary portion of the side elevational view in FIG. 27 of the other modified inner strap of one or the other sets thereof.
Figures 43, 44:
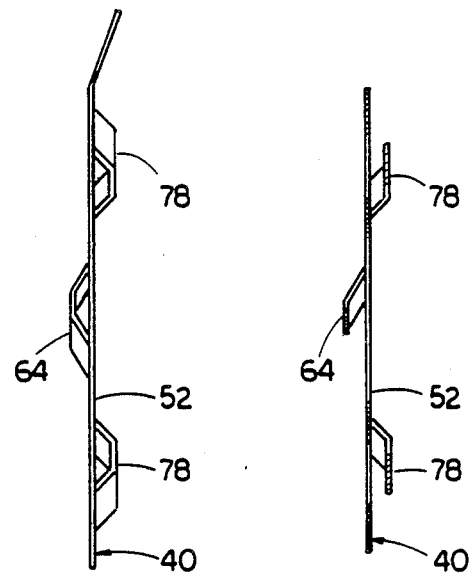
FIG. 43 is an end elevational view as seen along line 43—43 of FIG. 42, showing the set of modified dimples and the spring structure of the other modified inner strap.
FIG. 44 is a sectional view taken along line 44—44 of FIG. 42, showing the same set of modified dimples and spring as seen in FIG. 43.
Figure 46:
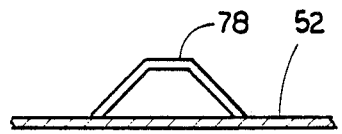
FIG. 46 is an enlarged sectional view taken along line 46—46 of FIG. 42, showing the curvature of the one of the modified dimples on the other modified inner strap from a different angle than seen in FIG. 45.
Figure 45:
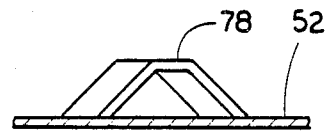
FIG. 45 is an enlarged sectional view taken along line 45—45 of FIG. 42, showing the curvature of one of the modified dimples on the modified inner strap.
Figure 48:
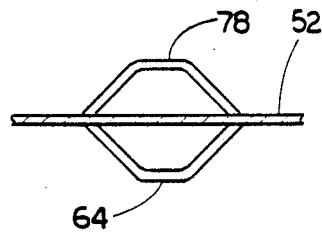
FIG. 48 is an enlarged sectional view taken along line 48—48 of FIG. 42, showing the curvatures of one of the modified dimples and the cross member of the spring structure of the modified strap.

In FIGS. 23, 24 and 35, the upper and lower dimples 78 are oriented again generally parallel to one another. This time the dimples 78 are also oriented generally parallel to the orientations of the spring structure cross members 64.

Figure 47:
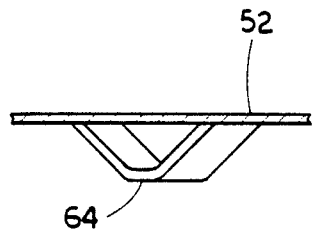
FIG. 47 is an enlarged sectional view taken along line 47—47 of FIG. 42, showing the curvature of the cross member of the spring structure of the modified strap.

Finally, in FIGS. 26, 27 and 47, the upper dimples 78 are oriented generally perpendicular to both the lower dimples 78 and the spring structure cross members 64. It should be readily apparent that the respective orientations of the upper and lower dimples 78 could be reversed with respect to one another and to the cross members 64.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a nuclear fuel rod grid including a plurality of inner and outer straps being interleaved with one another to form a matrix of hollow cells, each cell for receiving one fuel rod and being defined by pairs of opposing wall sections of said straps which wall sections are shared with adjacent cells, each cell having a central longitudinal axis, a fuel rod engaging spring structure of resiliently yieldable material being integrally formed on each wall section of said inner straps comprising:
    (a) a pair of laterally spaced elongated leg members each having a pair of opposite ends only at which is anchored to said wall section; and
    (b) an elongated cross member having a pair of opposite ends, said cross member extending diagonally between and integrally attached at its opposite ends to said leg members such that said spring structure formed by said leg and cross members has an effective length greater than the actual length it occupies on said wall section.

2. The spring structure as recited in claim 1, wherein said cross member at one of its opposite ends is rigidly attached to one of said leg members adjacent to one end thereof and at the other of its opposite ends is rigidly attached to the other of said leg members adjacent to the opposite other end thereof.

3. The spring structure as recited in claim 1, wherein the effective length of said spring structure formed by said leg and cross members is approximately two times greater than the actual length it occupies on said wall section.

4. The spring structure as recited in claim 1, wherein each said leg member is arcuate-shaped in its configuration along a longitudinal section therethrough so as to project from said wall section into one of said cells toward said central longitudinal axis thereof.

5. The spring structure as recited in claim 4, wherein said cross member is arcuate-shaped in configuration along a longitudinal section therethrough so as to project from said wall section farther into said one cell toward said central longitudinal axis thereof than said leg members project into said one cell for engaging a fuel rod when received through said one cell.

6. The spring structure as recited in claim 4, wherein said cross member is capable of resiliently deflecting in a direction generally orthogonal to and away from said longitudinal axis of said cell and toward said wall section upon engagement by a fuel rod when received in said cell.

7. The spring structure as recited in claim 6, wherein: said section is generally planar in configuration; and
said leg members project from the plane of said wall section when said cell is unoccupied by a fuel rod but are capable of resiliently deflecting back within the plane of said wall section due to resilient deflection of said cross member by engagement with a fuel rod received within said cell.

8. The spring structure as recited in claim 6, wherein said cross member is projecting from said wall section defines a space therebetween which permits unimpeded flow of coolant fluid therethrough and along a fuel rod received in said cell.

9. The spring structure as recited in claim 1, wherein said each leg member extends generally parallel to one another.

10. The spring structure as recited in claim 9, wherein each leg member extends in a direction generally parallel to said longitudinal axis of said cell.

11. The spring structure as recited in claim 10, wherein said cross member is disposed approximately forty-five degrees with respect to the direction of said longitudinal axis of said one cell.

12. The spring structure as recited in claim 9, wherein said cross member is disposed approximately forty-five degrees with respect to said each leg member.

13. In a nuclear fuel rod grid including a plurality of inner and outer straps being interleaved with one another to form a matrix of hollow cells, each cell for receiving one fuel rod and being defined by pairs of opposing wall sections of said straps which wall sections are shared with adjacent cells, each cell having a central longitudinal axis, a fuel rod engaging spring structure of resiliently yieldable material being integrally on each wall section of said inner straps comprising:
(a) a pair of laterally spaced elongated spring leg members each having a pair of opposite ends at which it is anchored to said wall section and being arcuate-shaped in its configuration along a longitudinal section therethrough so as to project from said wall section into one of said cells toward said central longitudinal axis thereof, each leg member also extending generally parallel to one another and in a direction generally parallel to said longitudinal axis of said cell; and
(b) an elongated cross spring member having a pair of opposite ends, said cross member extending diagonally between and attached at its opposite ends to said leg members and being arcuate-shaped in configuration along a longitudinal section therethrough so as to project from said wall section farther into said one cell toward said central longitudinal axis thereof than said leg membrs project into said one cell for engaging a fuel rod when received through said one cell, said cross member being disposed approximately forty-five degrees with respect to the direction of said longitudinal axis of said one cell.

14. The spring structure as recited in claim 13, wherein said cross member at one of its opposite ends is rigidly attached to one of said leg members adjacent to one end thereof and at the other of its opposite ends is rigidly attached to the other of said leg members adjacent to the opposite other end thereof such that said spring structure formed by said leg and cross members has an effective length approximately two times greater than the actual length it occupies on said wall section.

15. The spring structure as recited in claim 13, wherein said cross member is capable of resiliently deflecting in a direction generally orthogonal to and away from said longitudinal axis of said cell upon engagement by a fuel rod when received in said cell.

16. The spring structure as recited in claim 15, wherein:
said wall section is generally planar in configuration; and
said leg members project from the plane of said wall section when said cell is unoccupied by a fuel rod but are capable of resiliently deflecting back within the plane of said wall section due to resilient deflection of said cross member upon engagement with a fuel rod received within said cell.

17. The spring structure as recited in claim 13, wherein said cross member in projecting from said wall section defines a space therebetween which permits unimpeded flow of coolant fluid therethrough and along a fuel rod received in said cell.

18. In a nuclear fuel rod grid including a plurality of inner and outer straps being interleaved with one another to form a matrix of hollow cells, each cell for receiving one fuel rod and being defined by pairs of opposing wall sections of said straps, each cell having a central longitudinal axis, fuel rod engaging structure of resiliently yieldable material being integrally formed on each wall section of said inner straps comprising:
(a) at least one arcuate-shaped-dimple connected at its opposite ends to said wall section and projecting from said wall section into one of said cells toward said central longitudinal axis thereof;
(b) said dimple being oriented diagonally with respect to said central longitudinal axis of said cell.

19. The engaging structure as recited in claim 18, wherein said dimple is oriented approximately forty-five degrees with respect to said cell longitudinal axis.

20. The engaging structure as recited in claim 18, further comprising:
(c) a spring having a fuel rod engaging elongated cross member oriented diagonally with respect to said central longitudinal axis of said cell and projecting from said wall section into said cell toward said central longitudinal axis thereof.

21. The engaging structure as recited in claim 20, wherein said spring structure cross member is oriented approximately forty-five degrees with respect to said cell longitudinal axis.

22. The engaging structure as recited in claim 20, further comprising a pair of said dimples, one being located spaced above said spring and the other being located spaced below said spring on said wall section.

23. The engaging structure as recited in claim 22, wherein said dimples are oriented diagonally to said cell longitudinal axis and generally parallel to one another.

24. The engaging structure as recited in claim 22, wherein said dimples are oriented diagonally to said cell longitudinal axis and generally perpendicular to one another.

25. The engaging structure as recited in claim 22, wherein one of said dimples is oriented generally parallel to said spring cross member.

26. The engaging structure as recited in claim 22, wherein one of said dimples is oriented generally perpendicular to said spring cross member.

27. The engaging structure as recited in claim 18, further comprising:
(c) a fuel rod engaging spring projecting from said wall section into said cell toward said central longitudinal axis thereof.

28. The engaging structure as recited in claim 27, further comprising a pair of said dimples, one being located spaced above said spring and the other being located spaced below said spring on said wall section.

29. The engaging structure as recited in claim 28, wherein said dimples are oriented diagonally to said cell longitudinal axis and generally parallel to one another.

30. The engaging structure as recited in claim 28, wherein said dimples are oriented diagonally to said cell longitudinal axis and generally perpendicular to one another.

* * * * *